UNITED STATES PATENT OFFICE.

DENNIS C. GATELY, OF NEWTOWN, CONNECTICUT.

IMPROVEMENT IN MANUFACTURE OF INDIA-RUBBER BELTING.

Specification forming part of Letters Patent No. 26,580, dated December 27, 1859.

*To all whom it may concern:*

Be it known that I, DENNIS C. GATELY, of Newtown, in the county of Fairfield and State Connecticut, have invented a new and useful process of making machine belting or banding, made wholly or in part of india-rubber or gutta-percha; and I do hereby declare that the following description is a full and exact specification of the same, wherein I have set forth the nature and principles of my said invention, by which it may be distinguished from all others of a similar class, together with such parts as I claim and desire to have secured to me by Letters Patent.

The present invention consists in a new method of manufacturing a machine belting or banding, for which I have previously made application for separate Letters Patent, the said belting or banding being composed wholly or in part of india-rubber or gutta-percha, and having as its essential feature a smooth and finished friction-surface. A new method of producing this smooth friction-surface forms the subject of the present improvement, for which I desire to secure Letters Patent; and I will now proceed to describe the process in detail.

I make up a belt in any proper manner previous to vulcanizing it, and roll it tightly up together with some non-adhesive substance, like soapstone-dust, powdered rubber, or other non-adhesive materials, sprinkled upon the surface of the belt or band, or any smooth composition which can afterward be removed without difficulty, can be rolled up with the rubber or gutta-percha belt or band. The whole is then vulcanized by placing it in a steam-heater, or by subjecting it to a dry heat, or in any other proper manner. By thus bringing the folds or layers of the belt in close contact with each other, with the interposition of a non-adhesive substance to prevent their sticking together during the curing process, the desired result of imparting a smooth and finished friction-surface to the belt or band is successfully attained.

It will be obvious that the winding or rolling up of the belt or band can be effected either by hand-labor or by machinery. I prefer to heat the belt partially before the final vulcanization in the manner described in another process for which I have applied for Letters Patent; but this is not indispensable.

The belt should be made up in such a manner that it has a smooth friction-surface before it is heated, and the powder, dust, or other substance placed between the folds should be made fine and smooth as possible in order to prevent any marks or depressions upon the surface of the belt.

What I claim as my invention, and desire to have secured to me by Letters Patent, is—

The improvement in the manufacture of machine belting or banding, composed wholly or in part of india-rubber or gutta-percha, the same consisting in rolling or winding up the belt or band with any suitable non-adhesive substance or composition interposed between its folds or layers, and then heating it, substantially in the manner and for the purposes described.

DENNIS C. GATELY.

Witnesses:
ELI BARNUM,
THEO. NICHOLS.